United States Patent
Larson

(10) Patent No.: US 7,290,561 B2
(45) Date of Patent: Nov. 6, 2007

(54) PULSATION CAUSING VALVE FOR A PLURAL PISTON PUMP

(75) Inventor: Steve A. Larson, Isanti, MN (US)

(73) Assignee: Diversified Dynamics Corporation, Minneapolis, MN (US)

( * ) Notice: Subject to any disclaimer, the term of this patent is extended or adjusted under 35 U.S.C. 154(b) by 371 days.

(21) Appl. No.: 11/013,590

(22) Filed: Dec. 16, 2004

(65) Prior Publication Data

US 2006/0216174 A1  Sep. 28, 2006

(51) Int. Cl.
*F16K 15/18* (2006.01)
*F04B 39/08* (2006.01)

(52) U.S. Cl. .................. 137/523; 251/65; 251/83; 417/446; 417/505

(58) Field of Classification Search .......... 137/522, 137/523; 251/82, 83; 417/446, 505, 506
See application file for complete search history.

(56) References Cited

U.S. PATENT DOCUMENTS

| | | | | |
|---|---|---|---|---|
| 2,336,526 A | * | 12/1943 | Bristol | 417/446 |
| 2,362,750 A | * | 11/1944 | Hayward | 417/559 |
| 2,693,933 A | * | 11/1954 | Meinke | 251/65 |
| 2,700,395 A | * | 1/1955 | Young | 137/523 |
| 2,824,759 A | | 2/1958 | Tracy | |
| 3,181,473 A | | 5/1965 | Duron | |
| 3,416,453 A | | 12/1968 | Feuillebois et al | |
| 3,600,101 A | | 8/1971 | Oglesby et al. | |
| 3,602,613 A | | 8/1971 | Gunther et al. | |
| 3,829,255 A | * | 8/1974 | Bykov et al. | 417/446 |
| 3,874,678 A | | 4/1975 | Potter | |
| 3,930,756 A | | 1/1976 | Bruggeman | |
| 4,027,744 A | | 6/1977 | Kuhnelt et al. | |
| 4,232,695 A | * | 11/1980 | Roberge | 251/65 |
| 4,239,460 A | | 12/1980 | Golz | |
| 4,350,182 A | | 9/1982 | Gottling et al. | |
| 4,351,531 A | | 9/1982 | Maasberg et al. | |

(Continued)

FOREIGN PATENT DOCUMENTS

DE          1195121          6/1965

(Continued)

OTHER PUBLICATIONS

CAT PUMPS brochure, 18 Frame Block-Style Stainless Steel Plunger Pump, four pages.

(Continued)

*Primary Examiner*—John Rivell
(74) *Attorney, Agent, or Firm*—Gerald E. Helget; Briggs and Morgan, P.A.

(57) ABSTRACT

A valve for causing pulsatile flow in a multi-piston plunger pump includes a valve poppet, a valve seat, and a spring biasing the valve poppet against the valve seat; and a mechanism holding the valve poppet in an open position, thereby producing pulsatile flow from the pump. The mechanism includes a magnet and an adjustment mechanism for moving the magnet toward and away from the valve poppet. When the magnet is moved toward the valve poppet, the magnet attracts the poppet away from the valve seat, and when the magnet is moved away from the valve poppet, the magnet releases the poppet. The spring then biases the poppet against the valve seat in a closed position.

11 Claims, 3 Drawing Sheets

U.S. PATENT DOCUMENTS

| | | |
|---|---|---|
| 4,408,767 A | 10/1983 | Kako |
| 4,420,935 A | 12/1983 | Kobald |
| 4,574,833 A * | 3/1986 | Custer .................. 251/65 |
| 4,700,668 A | 10/1987 | Schierling et al. |
| 4,714,199 A | 12/1987 | Heath et al. |
| 4,785,842 A | 11/1988 | Johnson, Jr. |
| 4,900,039 A | 2/1990 | Klecker et al. |
| 4,913,628 A | 4/1990 | Samland et al. |
| 5,026,259 A | 6/1991 | Whitehead et al. |
| 5,069,239 A * | 12/1991 | Bunce et al. .................. 251/65 |
| 5,114,160 A | 5/1992 | Ootsuka et al. |
| 5,143,515 A | 9/1992 | Boster et al. |
| 5,249,812 A | 10/1993 | Volden et al. |
| 5,338,160 A * | 8/1994 | Thurner .................. 417/505 |
| 5,421,892 A | 6/1995 | Miyagi |
| 5,580,225 A | 12/1996 | Salecker |
| 5,984,650 A | 11/1999 | Okubo et al. |
| 6,015,270 A | 1/2000 | Roth |
| 6,045,334 A | 4/2000 | Murphy et al. |
| 6,158,972 A | 12/2000 | Ruth |
| 6,178,951 B1 | 1/2001 | Doreau et al. |
| 6,227,818 B1 | 5/2001 | Falk et al. |
| 6,705,432 B2 | 3/2004 | Conley et al. |
| 6,810,998 B2 | 11/2004 | Conley et al. |

FOREIGN PATENT DOCUMENTS

| | | | |
|---|---|---|---|
| DE | 10058049 C1 | 5/2002 | |
| DE | 10256754 | 7/2004 | |
| GB | 2057639 A * | 4/1981 | .................. 251/65 |
| WO | WO2004/072477 A1 | 8/2004 | |
| WO | WO2005/005830 A1 | 1/2005 | |

OTHER PUBLICATIONS

CAT PUMPS brochure, 7 Frame Plunger Pump, four pages.
How Cat Pumps Work?, www.catpumps.com, three pages.

\* cited by examiner

PULSATION CAUSING VALVE FOR A PLURAL PISTON PUMP

BACKGROUND OF THE INVENTION

High pressure water has long been used to clean blocked and silted drainage, sewer, and other conduits. Water is pumped through a flexible hose at high pressure and is expelled controllably at a downstream nozzle. Jets on the nozzle direct the discharging water angularly with respect to the hose in a trailing direction.

To effect a cleaning operation, the nozzle, which is normally at the leading end of the hose, is introduced to the sewer or other conduit to be cleaned. The water discharging from the jets propels the nozzle and hose forwardly through the conduit. At the same time, the pressurized water scours the walls of the conduit, if excessive or stubborn buildup is present in the conduit, a leading jet may be provided to propel liquid forwardly to break through any obstruction and define a path for the nozzle.

The above technique is employed using different nozzle and hose types, different flow rates and volumes and different pressures, as the particular job dictates. With this technique, it is possible to penetrate and effectively clean conduits up to 400 feet in length. This length is generally the maximum that is encountered for industrial, municipal, and household applications by reason of the regular access afforded through manholes.

While it may be possible to penetrate longer conduits with the above described technique, this technique may not be adequate where curves, elbows, and traps are encountered and/or when the conduit length significantly exceeds 400 feet. To enhance advancement of the nozzle, particularly through a long, circuitous conduit pathway, and break up obstructions, it is known to interrupt the nozzle flow to produce a pulsed fluid delivery through the nozzle by repetitive interruption of high pressure flow through the nozzle. The interruption causes a pulsating action in the nozzle and reduces overall friction between the hose and the conduit wall as the hose advances through a conduit over or around an obstruction because the pulsating action causes the hose to "jump" and thereby break contact between the hose surface and conduit and/or blockage.

Systems are currently known for producing a pulsed delivery of a fluid, but these systems have drawbacks which demonstrate the need for an improved fluid pump.

U.S. Pat. No. 5,580,225 (Salecker), herein incorporated by reference, discloses a pulsation causing check valve assembly for a plural piston pump system Salecker employs a check valve having a hole there through which provides open communication between the outlet manifold of the pump and the piston chamber, and a blocking and sealing structure associated with the check valve for blocking and sealing the opening. When the hole is not blocked or sealed, fluid can flow from the outlet manifold into the piston cylinder and fluid exits the pump in a pulsed or vibratory flow. However, this patent does not completely solve the above problems. In particular, this arrangement causes wear in the check valve. Furthermore, fluid flow from the check valve is not completely shut off.

U.S. Pat. No. 6,045,334 (Murphy), herein incorporated by reference, discloses a valve disabler for use in high pressure pipe cleaning operations. Unlike Salecker, which partially disables flow to the output manifold in a single valve, Murphy completely disables flow from the input manifold into a single cylinder. Murphy employs an adjusting stem to lock the valve poppet into position against the valve seat such that the valve poppet cannot be removed from the valve seat. This effectively thwarts the ingress of fluid into the cylinder associated with the valve disabler, which, in turn, renders the outlet valve virtually useless in its pumping capacity. However, this arrangement causes cavitations or starving of the associated cylinder which harms the pump.

There is a need for a pulsation causing valve for a plural piston pump which addresses the above problems.

SUMMARY OF THE INVENTION

A valve for causing pulsatile flow in a multi-piston plunger pump includes a valve poppet, a valve seat, and a spring biasing the valve poppet against the valve seat; and a mechanism holding the valve poppet in an open position, thereby producing pulsatile flow from the pump. The mechanism includes a magnet and an adjustment mechanism for moving the magnet toward and away from the valve poppet. When the magnet is moved toward the valve poppet, the magnet attracts the poppet away from the valve seat, and when the magnet is moved away from the valve poppet, the magnet releases the poppet. The spring then biases the poppet against the valve seat in a closed position.

A principal object and advantage of the present invention is that it produces pulsating flow from the pump without causing wear on the valve.

Another principal object and advantage of the present invention is that it completely shuts off flow from the valve cylinder.

Another principal object and advantage of the present invention is that it prevents cavitations and starving of the valve cylinder when the valve is shut off.

DETAILED DESCRIPTION OF THE PREFERRED EMBODIMENT

Figure 1:
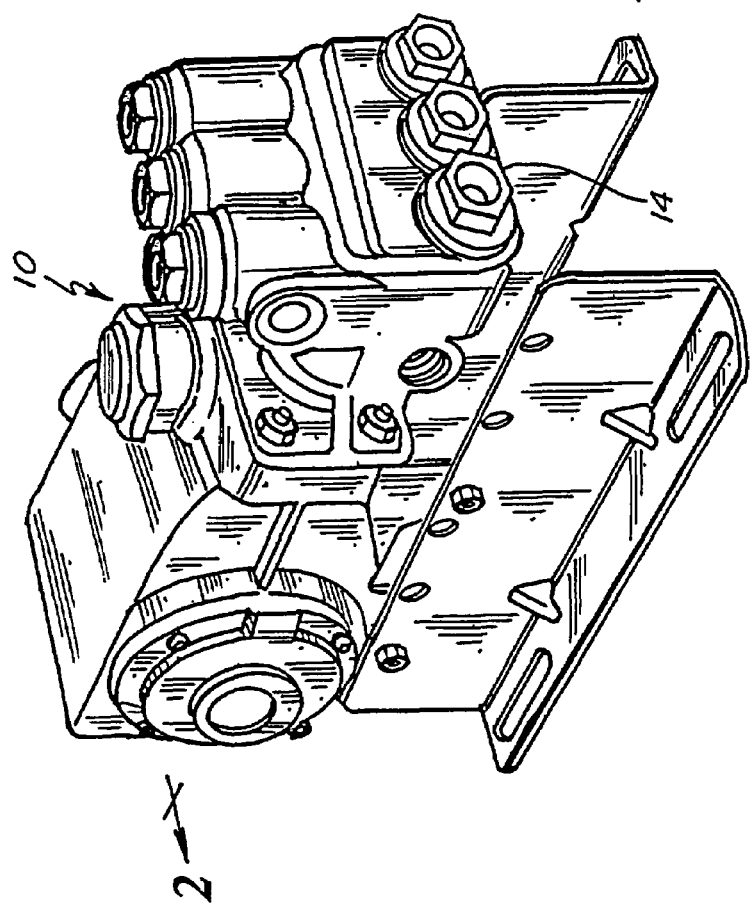
FIG. 1 is a perspective view of a plural piston pump in which the present invention may be used.
Figure 2:
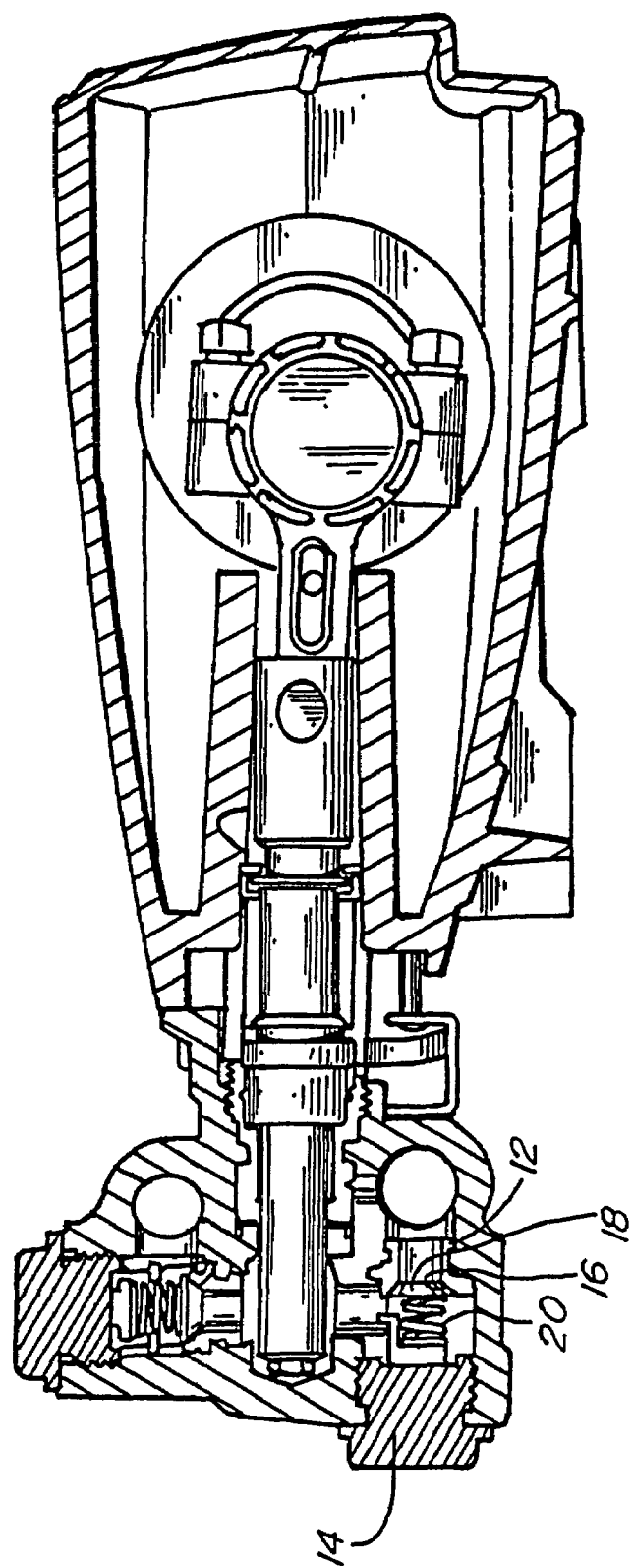
FIG. 2 is a cross-section of the pump of FIG. 1 at approximately the lines 2.

A pump in which the present invention may be mounted is shown in FIGS. 1 and 2. The pump 10 has a bore 12 for receiving a valve assembly 14, the valve assembly 14 including a valve poppet 16, a valve seat 18, and a spring 20 biasing the valve poppet 16 against the valve seat 18. The pump 10 as shown in the Figures is a multi-piston plunger pump, but the present invention can be used in any pump with an appropriate valve assembly.

In one aspect, the present invention is an apparatus 110 for disabling the valve assembly 14.

The apparatus 110 comprises a magnet 112 attracting the valve poppet 16 away from the valve seat 18, thereby holding the valve poppet 16 in an open position. The apparatus 110 further comprises an adjustment mechanism 113 for moving the magnet 112 toward and away from the valve poppet 16, whereby when the magnet 112 is moved toward the valve poppet 16, the magnet 112 attracts the valve poppet 16 away from the valve seat 18, and when the magnet 112 is moved away from the valve poppet 16, the magnet releases the valve poppet 16, the spring 20 again biases the poppet 16 against the valve seat 18 in a closed position.

In another aspect, the present invention is a valve 210 for causing pulsatile flow in a multi-piston plunger pump 10, the valve 210 comprising a valve poppet 16, a valve seat 18, and a spring 20 biasing the valve poppet 16 against the valve seat 18; and a mechanism 22 holding the valve poppet 16 in an open position.

In the preferred embodiment, the mechanism 22 is a magnet 112 attracting the valve poppet 16 away from the valve seat 18, thereby holding the valve poppet 16 in an open position. The mechanism 22 further comprises an adjustment mechanism 113 for moving the magnet 112 toward and away from the valve poppet 16, whereby when the magnet 112 is moved toward the valve poppet 16, the magnet 112 attracts the valve poppet 16 away from the valve seat 18, and when the magnet 112 is moved away from the valve poppet 16, the magnet releases the valve poppet 16, the spring 20 again biases the poppet 16 against the valve seat 18 in a closed position.

In either aspect, the magnet 112 is preferably a rare earth magnet. Rare earth magnets are many times more powerful than ceramic magnets, and thus the mechanism can be made smaller than would otherwise be required.

The apparatus 110 and valve 210 preferably further comprise a casing 114 enclosing the magnet 112. Preferably, the casing 114 has a bore 115 there through.

The bore 115 preferably encloses an adjusting rod 118 attached to the magnet 112, the adjusting rod 118 reciprocating within the bore 115. Preferably, the adjusting rod 118 is threaded within the bore 115. A spacer 117 prevents the magnet 112 from getting too close to the valve poppet 16 and thereby preventing the magnet from holding the valve poppet 16 against the seat 18.

The apparatus 110 and valve 210 preferably have a seal 120 between the adjusting rod 118 and the casing 114 to prevent the egress of fluid in the valve assembly past the adjusting rod 118.

Figure 3:
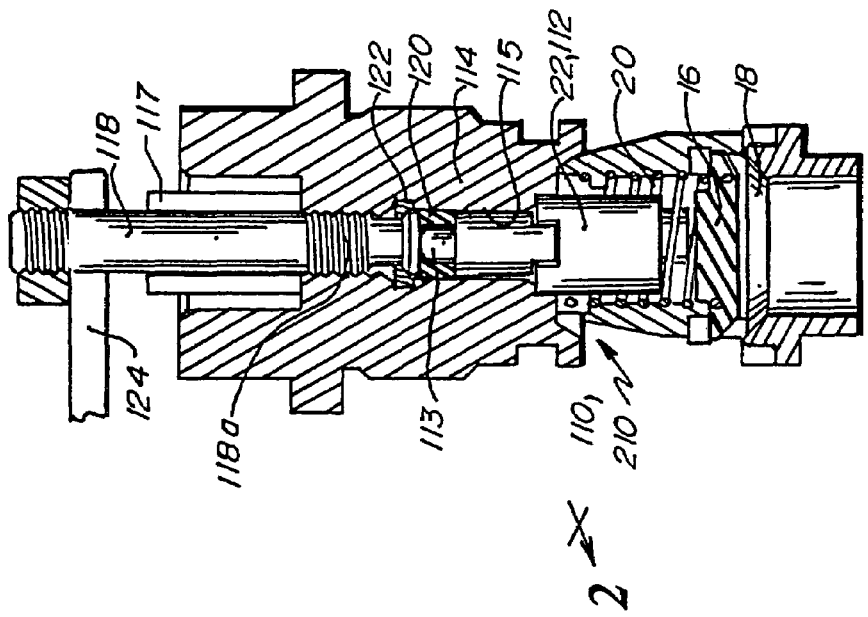
FIG. 3 is schematic cross-section of the valve of the present invention, in normal (non-pulsed) operating mode, showing the valve poppet in the open position.

A stem 122 is preferably disposed within the bore 115 to prevent the adjusting rod 118 from completely leaving the bore 115. As best seen in FIG. 3, the adjusting rod 118 is threaded within the bore 115 and the stem 122 has a larger diameter than the threaded portion 118a of the adjusting rod 118.

A handle 124 preferably engages the adjusting rod 118 for incremental movement of the adjusting rod 118 within the bore 115.

Operation of the apparatus 110 and valve 210 will now be described.

Figure 5:
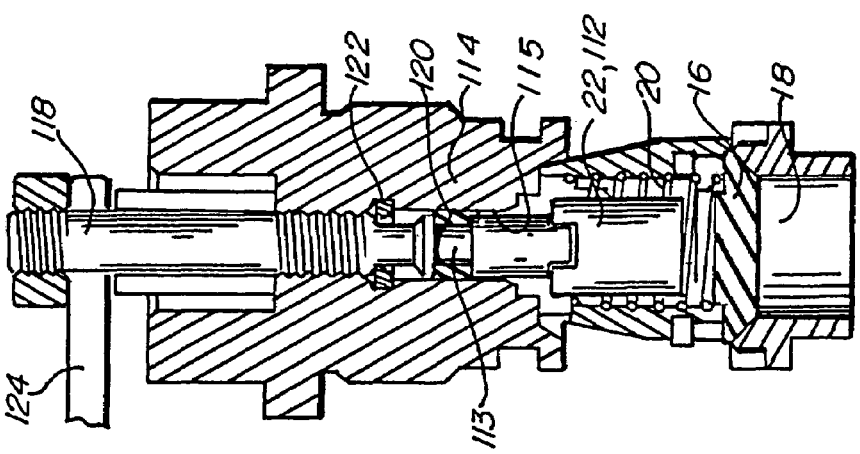
FIG. 5 is schematic cross-section of the valve of the present invention, in disabled (pulsed) operating mode, showing the valve poppet in the closed position.
Figure 6:
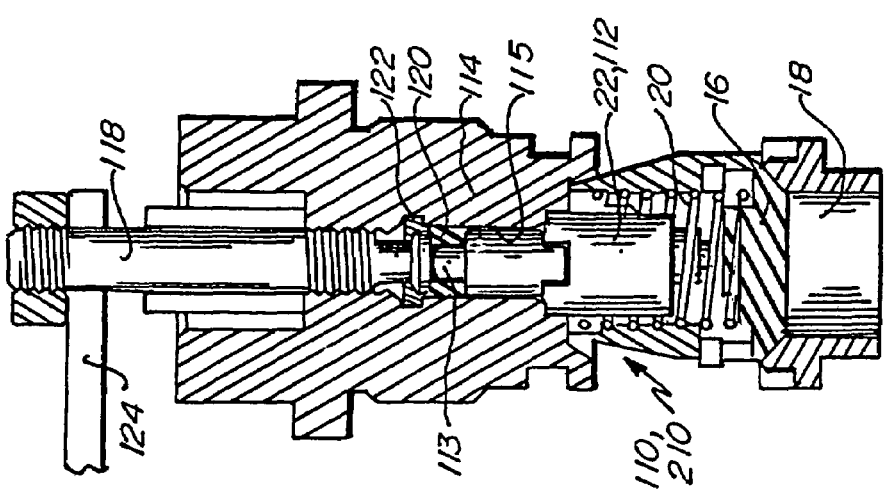
FIG. 6 is schematic cross-section of the valve of the present invention, in disabled (pulsed) operating mode, showing the valve poppet in the held open position.

For disabled (pulsatile) flow (FIGS. 5 & 6) through the valve assembly 14 and valve 210, the adjusting rod is turned, preferably by the handle 124, so that the magnet 112 attracts and holds the valve poppet 16 away from the valve seat against the bias of the spring 20. FIG. 5 shows the magnet 112 approaching the poppet 16. The magnet has not yet approached the poppet closely enough to attract the poppet. FIG. 6 shows the poppet 16 having been moved to within the magnet's attraction range by the pressure from the fluid flow, and the magnet 112 has then attracted the poppet 16 against itself. The poppet 16 is now held open away from the valve seat 18. In a multi-piston plunger pump, this will cause pulsatile flow because the valve assembly 14 and valve 210 are effectively completely disabled.

Figure 4:
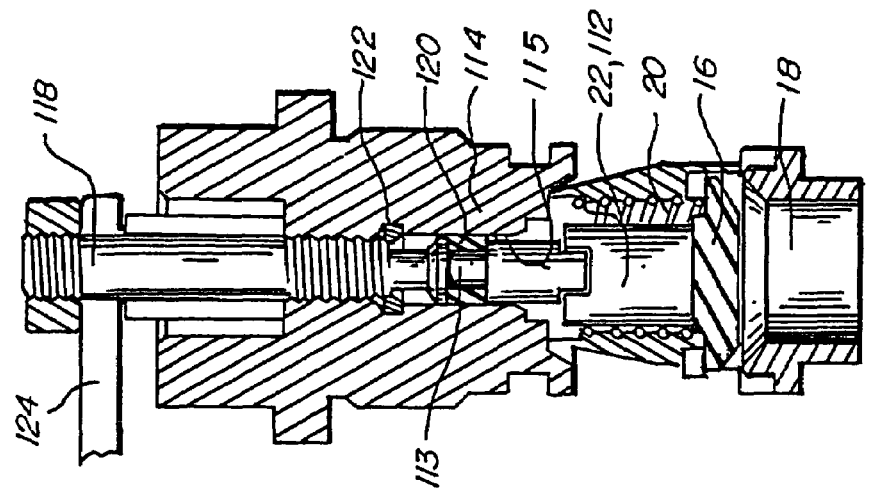
FIG. 4 is schematic cross-section of the valve of the present invention, in normal (non-pulsed) operating mode, showing the valve poppet in the closed position.

For normal (non-pulsatile) flow (FIG. 4) through the valve assembly 14 and valve 210, the adjusting rod is turned, preferably by the handle 124, so that the magnet 112 releases the valve poppet 16. The spring 20 will now bias the valve poppet 16 against the valve seat 18. The valve assembly 14 and valve 210 will now operate normally.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An apparatus for disabling a valve assembly in a pump, the pump defining a bore for receiving the valve assembly, the valve assembly including a valve poppet, a valve seat, and a spring biasing the valve poppet against the valve seat, the apparatus comprising:
   a magnet attracting the valve poppet away from the valve seat, thereby holding the valve poppet in an open position;
   an adjustment mechanism for moving the magnet toward and away from the valve poppet, whereby when the magnet is moved toward the valve poppet, the magnet attracts the poppet away from the valve seat, and when the magnet is moved away from the valve poppet, the magnet releases the poppet, the spring thereby again biasing the poppet against the valve seat in a closed position;
   (c) further comprising a casing enclosing the magnet wherein the casing has a bore therethrough;
   (d) wherein the bore encloses an adjusting rod attached to the magnet, the adjusting rod reciprocating within the bore; and
   (e) wherein the adjusting rod is threaded within the bore and further comprises a threaded portion.

2. The apparatus of claim 1, wherein the magnet is a rare earth magnet.

3. The apparatus of claim 1, further comprising a seal between the adjusting rod and the casing.

4. The apparatus of claim 1, further comprising a stem on the adjusting rod having a diameter larger than the threaded portion of the adjusting rod, thereby preventing the adjusting rod from completely leaving the bore.

5. The apparatus of claim 1, further comprising a handle engaging the adjusting rod for incremental movement of the adjusting rod within the bore.

6. A valve for causing pulsatile flow in a multi-piston plunger pump, the valve comprising:

(a) a valve poppet, a valve seat, and a spring biasing the valve poppet against the valve seat; and
(b) a mechanism holding the valve poppet in an open position, thereby producing pulsatile flow from the pump;
(c) wherein the mechanism further comprises a magnet and an adjustment mechanism for moving the magnet toward and away from the valve poppet, whereby when the magnet is moved toward the valve poppet, the magnet attracts the poppet away from the valve seat, and when the magnet is moved away from the valve poppet, the magnet releases the poppet, the spring thereby again biasing the poppet against the valve seat in a closed position;
(d) further comprising a casing enclosing the magnet wherein the casing has a bore there through wherein the bore encloses an adjusting rod attached to the magnet, the adjusting rod reciprocating within the bore; and
(e) wherein the adjusting rod is threaded within the bore and further comprises a threaded portion.

7. The apparatus of claim 6, wherein the magnet is a rare earth magnet.

8. The apparatus of claim 6, further comprising a seal between the adjusting rod and the casing.

9. The apparatus of claim 6, further comprising a stem on the adjusting rod having a diameter larger than the threaded portion of the adjusting rod, thereby preventing the adjusting rod from completely leaving the bore.

10. The apparatus of claim 6, further comprising a handle engaging the adjusting rod for incremental movement of the adjusting rod within the bore.

11. The apparatus of claim 6, further comprising a spacer preventing the magnet from getting too close to the valve poppet and thereby holding the valve poppet against the valve seat.

* * * * *